S. S. PALMER.
ANIMAL HOLDING MACHINE.
APPLICATION FILED APR. 24, 1913.

1,092,742.

Patented Apr. 7, 1914.

2 SHEETS—SHEET 1.

Witnesses
M. A. Wadhams
R. M. Smith

Inventor
S. S. Palmer
By
Attorney

S. S. PALMER.
ANIMAL HOLDING MACHINE.
APPLICATION FILED APR. 24, 1913.

1,092,742.

Patented Apr. 7, 1914.

2 SHEETS—SHEET 2.

Witnesses
M. A. Wadhams
R. W. Smith

Inventor
S. S. Palmer
By
Attorney

UNITED STATES PATENT OFFICE.

SUMNER S. PALMER, OF OAKLAND, IOWA.

ANIMAL-HOLDING MACHINE.

1,092,742.

Specification of Letters Patent.

Patented Apr. 7, 1914.

Application filed April 24, 1913. Serial No. 763,410.

*To all whom it may concern:*

Be it known that I, SUMNER S. PALMER, a citizen of the United States, residing at Oakland, in the county of Pottawattamie and State of Iowa, have invented certain new and useful Improvements in Animal-Holding Machines; and I do hereby declare the following to be a full, clear, and exact description of the invention, such as will enable others skilled in the art to which it appertains to make and use the same.

This invention comprehends improvements in animal holding machines and relates more particularly to a device which is especially adapted for holding a hog, calf, or similar animal and lifting the same to a convenient position for performing certain surgical operations.

The primary object of the invention is to provide a machine of this nature which shall be of very simple construction and which includes a stationary frame and a swinging frame, the latter comprising hinged sections between which the animal may be clamped and carried to the desired position.

The invention also aims to generally improve devices of this nature to render them more useful, practical, and commercially desirable.

With these and other objects in view, as will become more apparent as the description proceeds, the invention consists in certain novel features of construction, combination, and arrangement of parts, as will be hereinafter described and claimed.

Figure 1:
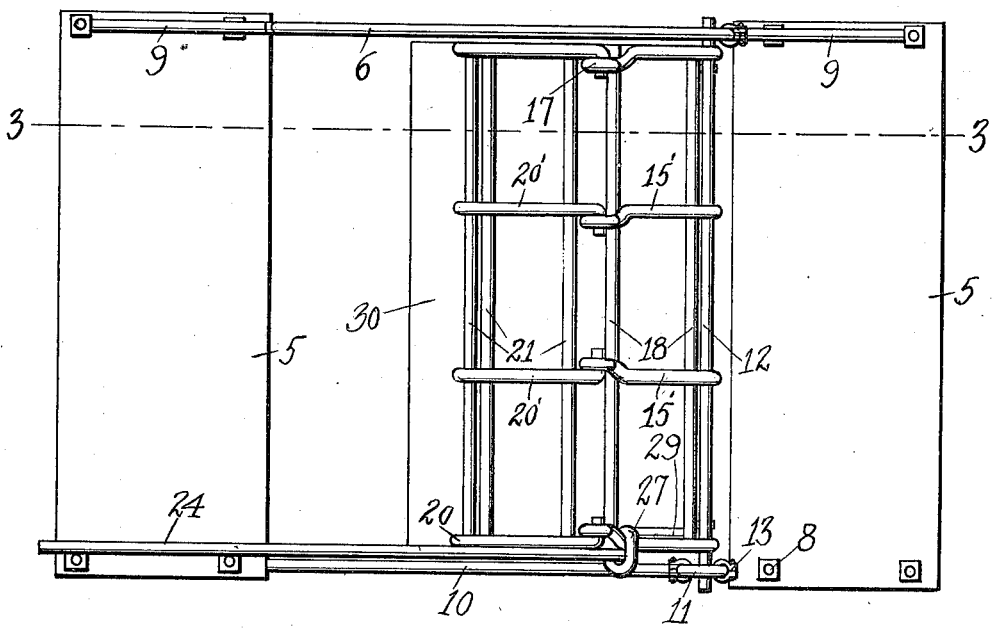
Figure 2:
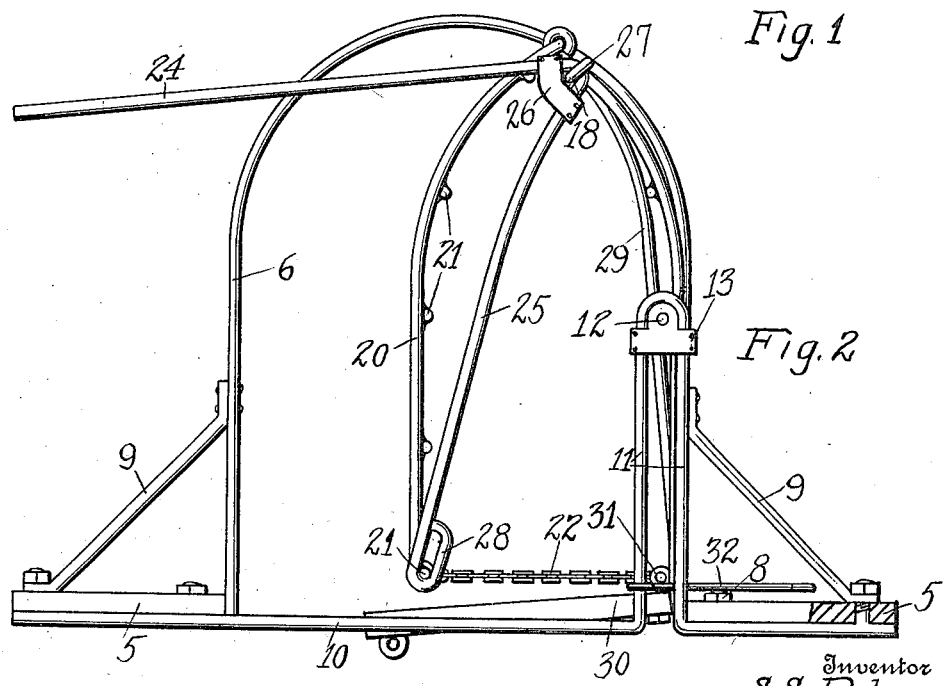
Figure 3:
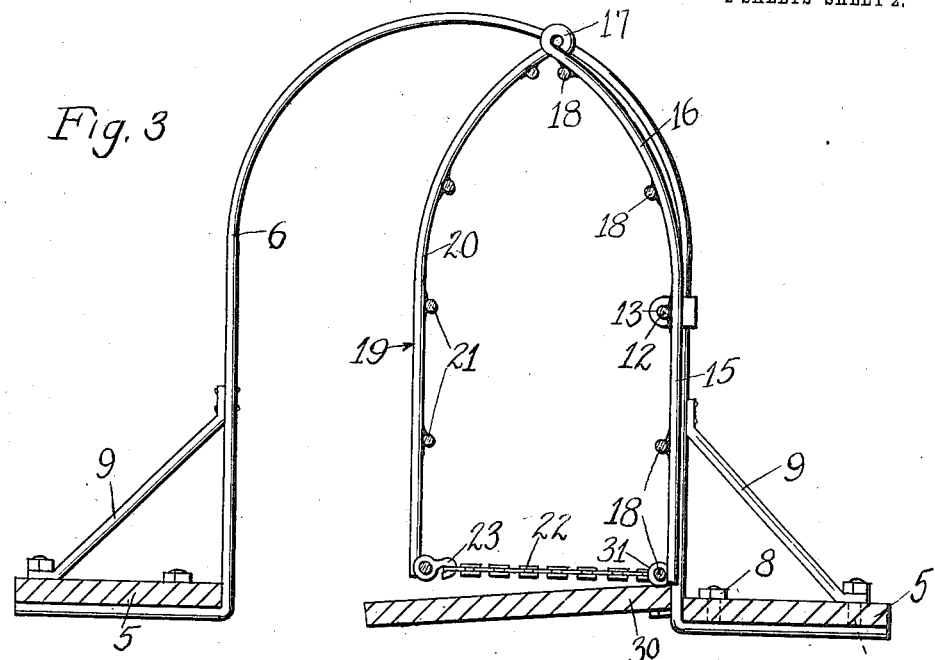
Figure 4:
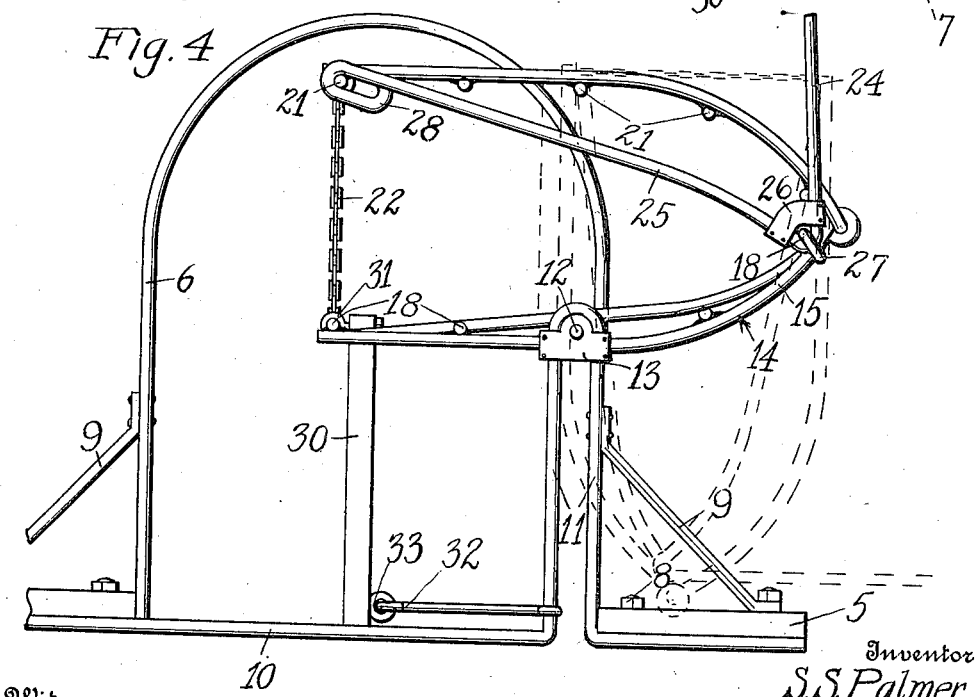

For a complete understanding of my invention, reference is to be had to the following description and accompanying drawings, in which, Figure 1 is a top plan view of my animal holding machine, Fig. 2 is a side elevation, Fig. 3 is a vertical sectional view taken on the plane of line 3—3 of Fig. 1, and, Fig. 4 is a side elevation, showing the animal holding frame swung so as to support the animal upon its side, and showing by dotted lines, the position of the frame when an animal is supported upon its back.

In the following description and accompanying drawing, similar parts will be referred to and designated by like characters of reference.

In its preferred embodiment, my invention comprises a stationary frame, a swinging frame mounted upon the stationary frame and adapted to hold an animal, and means for actuating the swinging frame so that an animal may be moved to different positions.

The stationary structure comprises the horizontal supports or base pieces 5, which extend in parallel spaced relationship to one another. These base pieces are connected at their rear ends by means of a continuous rod 6 which has its end portions extended transversely across the under side of said base pieces and its central portion shaped to form an arch. The end portions of the rod 6 are provided with vertical extensions 7 which extend through the base pieces and to which nuts 8 are secured. If desired, the arch formed by the rod 6 may be reinforced by suitable braces 9 which are connected at their inner ends to the vertical sides and at their outer ends to the base pieces. The forward ends of the base pieces 5 are connected by means of a rod 10 which is secured at its extremities to said base pieces in a manner similar to the rod 6, and which is bent intermediate its ends to provide the upstanding arms 11. These arms are adjacent one of the base pieces and extend to about half the height of the arch formed by the rod 6.

The swinging frame which holds the animal is supported upon a rotatable shaft 12 which is journaled at its ends within the bearings 13 secured to the parallel arms 11 and rod 6, respectively. The section 14 of the swinging frame comprises the end bars 15 which are rigidly secured centrally of their ends to the shaft 12 by soldering or any other suitable means. The upper portions of these bars are curved inwardly, as indicated at 16, and have loops 17 formed at their upper extremities. Transverse rods 18 are connected at their ends to the bars 15. The section 19 which forms the other half of the swinging frame is constructed in a manner similar to the section 14 and comprises the end bars 20 and transverse rods 21. The upper extremities of the end bars are extended angularly through the loops 17 and thus a pivoted connection is provided so that the sections may be swung toward or away from each other. The bars 15' and 20' which are secured to the frame sections 14 and 19, respectively, are constructed similar to the end bars thereof and act as braces.

In order to manipulate the section 19 of the swinging frame and move said frame in its entirety when the two sections are locked together by means of the chains 22, which are rigidly secured to one of the transverse rods 18 for removable engagement with the hooks 23, I provide a lever 24. This lever is a continuation of a neck engaging rod 25, and a strap 26 is secured to the lever and rod adjacent their opposed ends and secures said members to the uppermost transverse rod 18 adjacent its forward end. This rod is bent, as indicated at 27, for the purpose of preventing a detachment of the neck engaging rod and lever. The lower end of the rod 25 is formed with an elongated loop 28 which embraces the lowermost rod 21 of the frame section 19. It will be noted upon reference to Fig. 2 that the rod 25 extends somewhat across the forward end of the swinging frame and forms an acute angle with the lever 24 which is of considerable length. A second neck engaging rod 29 is secured at its upper end to the uppermost rod 18 and at its other end to the lowermost rod 18. This neck engaging rod is curved somewhat, as shown in Fig. 2, and is adapted to coöperate with the rod 25 and clamp against the neck of an animal.

A platform 30 is pivotally secured to the lowermost rod 18 by means of the eye bolts 31 and is primarily for the purpose of supporting the swinging frame in the position shown in Fig. 4. A hook 32 is connected to one of the arms 11 and engages an eye 33 carried by the platform, thus holding the latter steady.

In operation, an animal is led or driven through the arch formed by the rod 6 onto the platform 30 and between the sections of the swinging frame. By forcing the free end of the lever 24 downwardly the section 19 is swung toward the section 14 so that the neck engaging bars 25 and 26 clamp tightly against the neck of the animal. The sections may be locked in this position by means of the chains 22, various links of which may be secured to the hooks 23. If it is desired to ring the animal he is now in proper position and the operation may be easily performed.

When it is desired to support the animal upon its side, the swinging frame is swung to the position shown in Fig. 4 by means of the lever 24. During this movement the shaft 12 is rotated and the platform 30 is moved to a vertical position as illustrated. It is to be especially noted that the bar 10 of the stationary frame is so shaped as not to interfere with this movement of the animal. If it is desired to support the animal upon its back the frame may be easily swung to the proper position by use of the lever 24.

From the foregoing description taken in connection with the accompanying drawings, it will be seen that I have provided a very simply constructed animal holding machine which is especially adapted for use in connection with hogs, calves, and similar animals, and which will hold them without injury and support them in any desired position. The construction of the animal holding device is such as to permit of its being readily taken apart to facilitate transportation and to permit of its being packed in a relatively small space.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. In a machine of the character described, a supporting structure, a horizontal shaft journaled thereto, a rigid frame section fixed centrally of its upper and lower edges to said shaft, a second frame section hingedly connected at its upper edge to the upper edge of the first mentioned frame section, a neck engaging rod secured at one end to the lower edge of the second mentioned section and at its upper end to the side of the first mentioned section adjacent its upper edge, and a lever extending angularly from the upper extremity of the neck engaging rod, the two frame sections forming an animal retaining means which may be swung through an arc of 180°, the shaft acting as a pivot.

2. A machine of the character described, comprising a stationary frame, a rotatable shaft supported by said frame, an animal holding frame comprising a pair of sections, said sections being secured to each other at their upper edges only, one of the second mentioned frame sections being rigidly secured intermediate its upper and lower edges to the rotatable shaft, means for forcing the sections of the animal holding frame toward one another, said means also facilitating the swinging of the animal holding frame into various positions, and means for locking the sections of the animal holding frame in fixed relationship to one another.

3. A machine of the character described, comprising a stationary frame, a horizontal shaft journaled therein, a swinging frame comprising a pair of sections hingedly secured to each other at their upper edges, one of said sections being rigidly secured between its upper and lower edges to the rotatable shaft, a neck engaging rod connected to the other section adjacent its lower edge and to the first mentioned section adjacent its upper edge, a lever continuing from the upper extremity of the neck engaging rod and forming an acute angle therewith, means for holding the two sections in a fixed relationship, and means for supporting the swinging frame in such a position as to hold an animal upon its side.

4. A machine of the character described, comprising a supporting structure, a shaft journaled thereon, a swinging animal holding frame rigid with said shaft, a platform secured pivotally to the swinging frame, said platform serving to support the swinging frame when the latter is swung so as to support an animal upon its side and means carried adjacent the free edge of the platform for connection to said supporting structure whereby the platform may be locked in a vertical position.

In testimony whereof I affix my signature in presence of two witnesses.

SUMNER S. PALMER.

Witnesses:
 FAY. F. SMILEY,
 JESSIE JUNE SMILEY.

Copies of this patent may be obtained for five cents each, by addressing the "Commissioner of Patents, Washington, D. C."